United States Patent [19]

Yundt et al.

[11] 4,413,223

[45] Nov. 1, 1983

[54] INDUCTION GENERATOR FREQUENCY CONTROL SYSTEM

[75] Inventors: George B. Yundt, Cambridge; William P. Curtiss, Winthrop, both of Mass.

[73] Assignee: The Charles Stark Draper Laboratory, Inc., Cambridge, Mass.

[21] Appl. No.: 257,534

[22] Filed: Apr. 27, 1981

[51] Int. Cl.$^3$ .............................................. H02P 9/42
[52] U.S. Cl. ...................................... 322/32; 322/38; 322/40
[58] Field of Search ...................... 322/28, 29, 32, 38, 322/40–43, 22–24

[56] References Cited

U.S. PATENT DOCUMENTS 3,187,250 6/1965 Born et al. ............................. 322/32
3,253,211 5/1966 Worcester ............................. 322/32
3,412,258 11/1968 Satter ................................. 322/38 X

*Primary Examiner*—R. J. Hickey

*Attorney, Agent, or Firm*—Lahive & Cockfield

[57] ABSTRACT

A frequency control system for an n-phase induction machine having an input shaft and at least one output line, where n is an integer. The system includes a generator that provides an electrical frequency control signal, $f_e$, which is representative of the difference between the phase of the voltage on the output line and the phase of a reference signal. The system further includes a generator for providing a mechanical frequency control signal which is representative of the frequency of rotation of the input shaft to the induction generator. Another generator provides a torque generator control signal which is representative of the difference between the electrical frequency control signal and the mechanical frequency control signal. A torque generator, such as an internal combustion engine, is adapted to be responsive to the torque generator control signal for applying a torque to the input shaft of the induction machine, where the applied torque is related to the torque generator control signal.

9 Claims, 2 Drawing Figures

INDUCTION GENERATOR FREQUENCY CONTROL SYSTEM

REFERENCE TO RELATED APPLICATIONS

This application is related to U.S. Patent Application Ser. Nos. 188,305 now U.S. Pat. No. 4,356,440 and 188,306, both filed on Sept. 18, 1980.

BACKGROUND OF THE INVENTION

This invention is in the field of electric power generation, and more particularly, relates to induction generator systems.

Virtually, all electric power generators in current use are synchronous machines. Such generators are typically connected together to form an electric power grid. In other cases, synchronous generators are operated as autonomous electric power generators. While such synchronous machines do effectively perform in the required electrical power generating applications, those machines are relatively high cost compared with other known generators such as induction machines adapted for operation in a power generation mode.

In the application of induction machines to power generation, an induction machine is generally driven by a prime mover or torque generator, such as an internal combustion engine. The torque generator has an output shaft which is coupled to drive the input shaft of the induction generator. Generally, in the prior art, the electrical frequency of the power produced on the output lines of the induction generator is compared with a reference, for example, 50 Hertz, and the frequency differential is used to control the torque produced by the torque generator in a closed loop fashion. A common form of this control system uses a controlled throttle between an internal combustion engine and its fuel supply as the input variable.

Since this control configuration feeds back around the cascade combination of the torque generator and the induction machine, the closed loop bandwidth must be lower than that possible for the torque generator taken alone. Although this relatively low bandwidth control system can keep the average value of the induction generator output frequency correct, it will not have high immunity to local disturbances, such as may be due to local load switching. For example, when a large electrical load drops off, the torque generator's load can fall towards zero in a fraction of a cycle of the electrical output. During the one or two output electrical cycles before this frequency control loop can respond to the load change, the excess torque supplied by the torque generator will result in too large an input shaft frequency to the induction machine. The combination of the induction machine's slip frequency going to near zero, and the over frequency on the induction machine's shaft input, can result in a substantial output frequency overshoot. This undesirable output frequency overshoot can many times turn into a relatively long time over-frequency condition since, although prime movers can supply torque, most cannot actively slow down except through minimal frictional losses. This relatively long time overfrequency condition can also create problems for the voltage control loop.

It is an object of the present invention to provide an improved system and method for controlling an induction generator system.

SUMMARY OF THE INVENTION

Briefly, the present invention includes an n-phase induction machine having an input shaft and at least one output line, where n is an integer. A generator provides an electrical frequency control signal, $\dot{\theta}_c$, which is representative of the difference between the phase of the voltage on the output line and the phase of a reference signal. The system further includes a generator for providing a mechanical frequency control signal, $f_m$, which is representative of the frequency of rotation of the input shaft to the induction generator. Another generator provides a torque generator control signal, $f_t$, which is representative of the difference between $f_m$ and $\dot{\theta}_c$. A torque generator, such as an internal combustion engine, is adapted to be responsive to the signal $f_t$ for applying a torque to the input shaft of the induction machine, where the applied torque is related to the signal $f_t$.

In the preferred form, the torque generator may be an internal combustion engine having its output shaft coupled to the induction machine input shaft. The engine further has an input throttle and associated control network which is responsive to $f_t$ so that the torque applied to the input shaft is related to $f_t$.

In this form, the $f_m$ generator may include a network for generating a pulse stream having an instantaneous frequency proportional to the instantaneous frequency of the input shaft, and further includes a voltage to frequency converter responsive to the pulse stream to generate a voltage proportional to the frequency of the pulse stream. This latter signal corresponds to the signal $f_m$.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
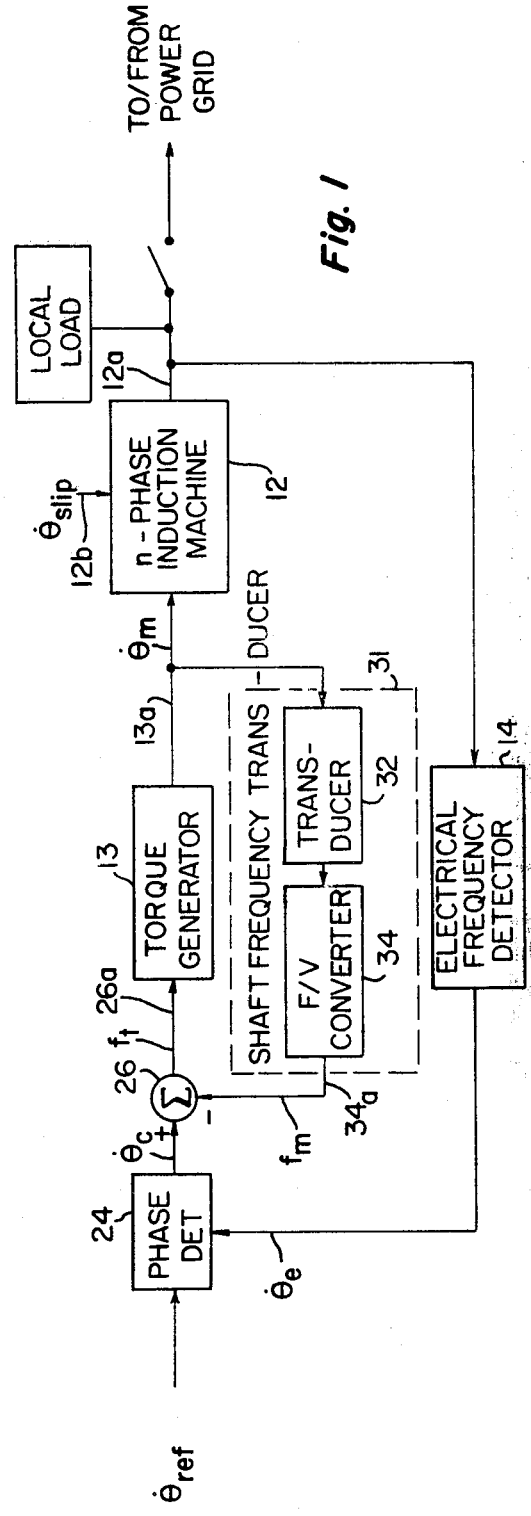
FIG. 1 shows, in block diagram form, an exemplary embodiment of the present invention.

FIG. 1 shows in general form, an embodiment of the present invention. In that figure, an n-phase (where n is an integer) induction machine 12 has an input shaft coupled (as denoted by reference designation 13a) to a prime mover (or torque generator) 13. The induction machine 12 includes an output line 12a coupled to a local load 16. The output line 12a may also be coupled by way of switch 20 to an external power grid. The control signal $\dot{\theta}_{slip}$ is applied to machine 12 by way of line 12b.

A first, or outer, feedback loop includes an electrical frequency detector 14 coupled between line 12a and a first input of a phase detector network 24. Detector 14 provides a signal $\dot{\theta}_e$ which is representative of the electrical frequency of the voltage on line 12a to the first input of phase detector 24. Network 24 comprises that signal with a reference signal $\dot{\theta}_{ref}$ applied to a second input to generate an electrical frequency control signal $\dot{\theta}_c$ on one 24a. Line 24a is coupled to a first input of a summing network 26.

A second, or inner, feedback loop includes a mechanical (or shaft) frequency transducer 30 coupled between line 13a and second input of summing network 26. Shaft frequency transducer includes a transducer 32 which senses the rotation rate $\dot\theta m$ of the input shaft of induction machine 12. In the preferred form of the invention, transducer 32 provides a stream of pulses having an instantaneous frequency proportional to the rotational frequency of the input shaft of machine 12. A frequency-to-voltage converter 34 converts that signal $\dot\theta_m$ to a mechanical frequency control signal $f_m$ on line 34a. This signal is coupled to a second input of summing network 26. Network 26 provides an output signal ft on line 26a, where ft is representative of the difference between $\theta_c$ and $f_m$. The latter signal $f_t$ is applied to the torque generator 13 to provide closed loop operation for the two loops.

In this configuration, there are in effect two nested feedback loops; the first, or outer, loop, being an electrical frequency control loop which comprises the phase of the output electrical frequency from the induction generator to the phase of a reference frequency signal and generates the electrical frequency control signal $\theta_c$. The second, or inner, loop provides feedback around the torque generator and provides a signal representative of the mechanical speed of the output shaft of the torque generator to generate the mechanical frequency control signal $f_m$. These two signals are combined so that their difference drives the torque generator in a closed loop manner.

In one form of the present invention, the torque generator 13 is an internal combustion engine. The control signal $f_t$ in that configuration represents a signal for controlling the throttle between the engine 13 and its fuel supply. Consequently, as $f_t$ varies the position of the throttle, the engine 13 provides a varying amount of torque to the input shaft of machine 12 in a closed loop manner.

Where the number of pulses produced per shaft revolution is relatively large, the inner loop provides wide bandwidth and thus relatively fast response so that the throttle may be quickly operated to control the engine speed as electrical loads are switched on and off. The high bandwidth may be particularly attained by using a multitooth encoder mounted on the flywheel of the engine output shaft or a similar device coupled to the induction machine input shaft. The high output frequency of the flywheel transducer minimizes the lag in measurement of engine speed.

The outer loop in this configuration is an integrating loop that tightly regulates the electrical frequency. As a result of its relatively low bandwidth, this loop provides noise immunity because its time constant is several cycles of the nominal frequency of the induction generator.

Basically, the use of the high speed (inner) loop provides relatively rapid adjustment of the throttle to minimize rapid, potentially large amplitude mechanical frequency variations of the engine shaft, which can be caused by switching loads. Without this loop, significant engine overrevving can occur when electrical load is switched off, suddenly removing the torque load on the engine. The relatively slow response outer loop is thus shielded by the inner loop from large amplitude input generator shaft disturbances. In the steady state, this outer loop provides fine adjustment of engine shaft speed resulting in relatively precise control of the electrical frequency output for long term operation.

Figure 2:
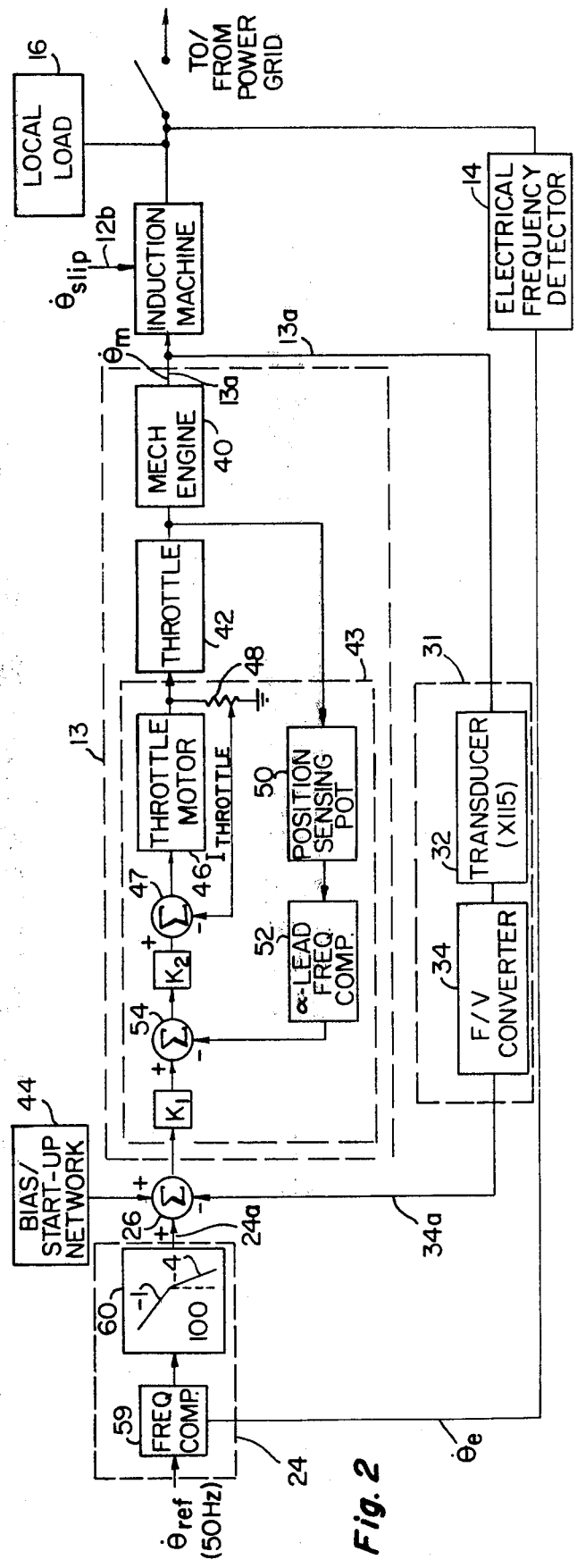
FIG. 2 shows, in detailed block diagram form, another exemplary embodiment of the present invention.

FIG. 2 shows an alternative system for controlling the operation of induction generator which is similar to that shown in FIG. 1, but where the torque generator 13 includes a mechanical engine 40 and associated throttle 42 and system 43 for controlling the position of that throttle. In FIG. 2, elements which are common to the system of FIG. 1 are identified with identical reference designations.

The system of FIG. 2 includes two outer loops which are substantially similar to the loops disclosed in conjunction with FIG. 1, except that the phase detector 24 of the first outermost loop is replaced by a frequency comparator 59 followed by a loop filter 60. The comparator 59 provides a signal to filter 60 which is representative of the difference in frequency between $\theta_{ref}$ and $\theta_e$. The filter 60 has a break frequency at 100 radians/second for the 50 Hertz outer loop, and this functions as an integrator. The transducer 32 of the second outermost loop includes a flywheel coupled to the output shaft of engine 13 and an associated sensor. The flywheel has a plurality of peripheral gearteeth and the associated transducer provides a pulse for each predetermined magnitude angular movement (representative of one gear tooth) of that flywheel. In the present embodiment, the flywheel/sensor combination has an effective multiplier of 115, so that, for example, at 50 Hertz, the pulse repetition rate (or instantaneous frequency) of $\dot\theta_m$ is 50×115 Hertz. These outermost loops function substantially the same as the corresponding loops in FIG. 1.

The summing network 26 also is coupled to a an operating point bias/start-up ramp network 44 which provides operating point bias and a start-up ramp for the engine in the torque generator 13.

In the torque generator 13 of FIG. 2, there are two nested inner loops. The innermost loop includes a throttle motor 46, summing network 47, and voltage to current converter 48. The function of this loop is to remove to lag inductance of the throttle motor. The next outer loop incorporates a potentiometer 50 (for sensing the throttle position), an α-lead frequency compensation network 52, and summing network 54. This loop senses the position of the throttle and linearizes the throttle motor and de-sensitizes the outer loop to throttle motor parameters.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A frequency control system for an induction generator including an n-phase induction machine having an input shaft and at least one output line, where n is an integer, comprising:
   A. means for generating an electrical frequency control signal, $\theta_c$, representative of the difference between the frequency of the voltage on said output line and a reference value,
   B. means for generating a mechanical frequency control signal, $f_m$, representative of the frequency of rotation of said input shaft, C. means for generating a torque generator control signal, $f_t$, representative of the difference between $f_m$ and $\theta_c$, D. torque generating means responsive to $f_t$ for applying a torque to said input shaft, said applied torque being related to $f_t$.

2. A system according to claim 1 wherein said electrical frequency control signal generating means includes means for detecting the difference in the electrical frequency of the voltage on said output line and said reference value and includes integrating means for integrating said detected difference and means responsive thereto for generating said electrical frequency control signal.

3. A system according to claim 1 wherein said electrical frequency control signal generating means includes means for detecting the difference in the phase of the voltage on said output line and said reference value and means responsive thereto for generating said electrical frequency control signal.

4. A system according to claim 1 or 2 or 3 wherein said torque generating means is an internal combustion engine having an output shaft coupled to said induction machine input shaft, and having an input throttle and associated control network, said throttle and network being responsive to ft whereby the torque applied to said input shaft is related to $f_t$.

5. A system according to claim 4 wherein said fm generating means includes means for generating a pulse stream, said pulse stream having an instantaneous frequency proportional to the instantaneous frequency of said input shaft, and further includes a frequency-to-voltage converting means responsive to said pulse stream to generate a voltage proportional to the frequency of said pulse stream, said voltage corresponding to fm.

6. A system according to claim 5 wherein said pulse stream generating means includes a flywheel coupled to said output shaft and a means for generating a pulse for each predetermined magnitude angular movement of said flywheel.

7. A system according to claim 1 or 2 or 3 wherein said fm generating means includes means for generating a pulse stream, said pulse stream having an instantaneous frequency proportional to the instantaneous frequency of said input shaft, and further includes a frequency-to-voltage converting means responsive to said pulse stream to generate a voltage proportional to the frequency of said pulse stream, said voltage corresponding to $f_m$.

8. A system according to claim 7 wherein said pulse stream generating means includes a flywheel coupled to said output shaft and a means for generating a pulse for each predetermined magnitude angular movement of said flywheel.

9. A system according to claim 4 wherein said throttle includes a butterfly valve in the fuel line for said engine, and wherein control network includes means responsive to $f_t$ to control the position of said valve.

* * * * *